July 3, 1945.   C. E. MABBS   2,379,816
CAPSULATING PROCESS AND APPARATUS
Filed July 17, 1939   2 Sheets-Sheet 1

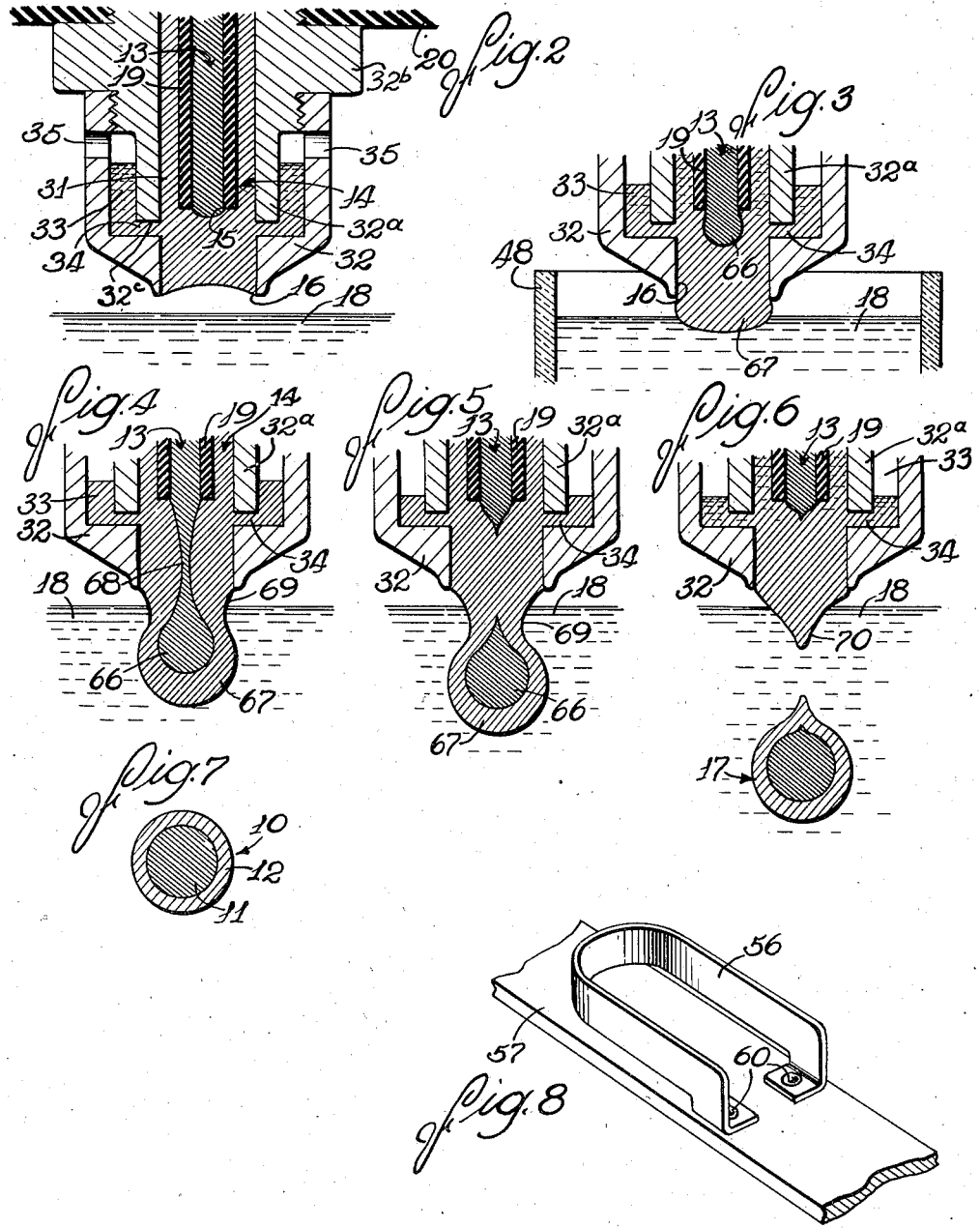

Patented July 3, 1945

2,379,816

UNITED STATES PATENT OFFICE 2,379,816

CAPSULATING PROCESS AND APPARATUS

Carl E. Mabbs, Chicago, Ill., assignor, by mesne assignments, to Gelatin Products Corporation, Detroit, Mich., a corporation of Michigan Application July 17, 1939, Serial No. 285,023

28 Claims. (Cl. 18—5)

This invention relates to the continuous formation of seamless, sealed capsules and has particular reference to the capsulation of core materials in the liquid or plastic state in a soluble shell of gelatin or the like material.

The primary object is to produce a seamless sealed capsule having a shell which is of uniform thickness throughout and which is gelled around a core of the material to be encased.

Another object is to produce seamless, sealed capsules by natural formation of compound drops without the use of dies in any form.

A more detailed object is to discharge measured quantities of core and shell materials from orifices in the relation the materials occupy in the completed capsule and permit these materials to be subject to natural forces while a composite drop is being formed and also while the shell material is being congealed.

Another object is to provide a novel nozzle construction for forming the composite drops.

A further object is to control the descent of the composite drop to effect proper solidification of the shell material.

A more specific object is to cause solidification of the composite drop shell by formation of a composite drop in and descent through a body of liquid having a density correlated to that of the composite drop and maintained at a lower related temperature.

Still another object is to provide a novel mechanism for separating the capsules from the receiving liquid.

The invention also resides in the novel manner of drop formation by which all of the core material for each capsule is maintained in a single globule within the shell without waste.

Other objects and advantages of the invention will become apparent from the following detailed description taken in connection with the accompanying drawings, in which Figure 1 is a schematic view of an apparatus for carrying out the invention.

Figs. 2, 3, 4, 5, and 6 are fragmentary views illustrative of the progressive stages in the formation of compound drops in accordance with the present invention.

Fig. 7 is a cross sectional view of a finished capsule.

Fig. 8 is a perspective view of a capsule retrieving bucket attached to a section of the conveyor belt.

Figure 1:
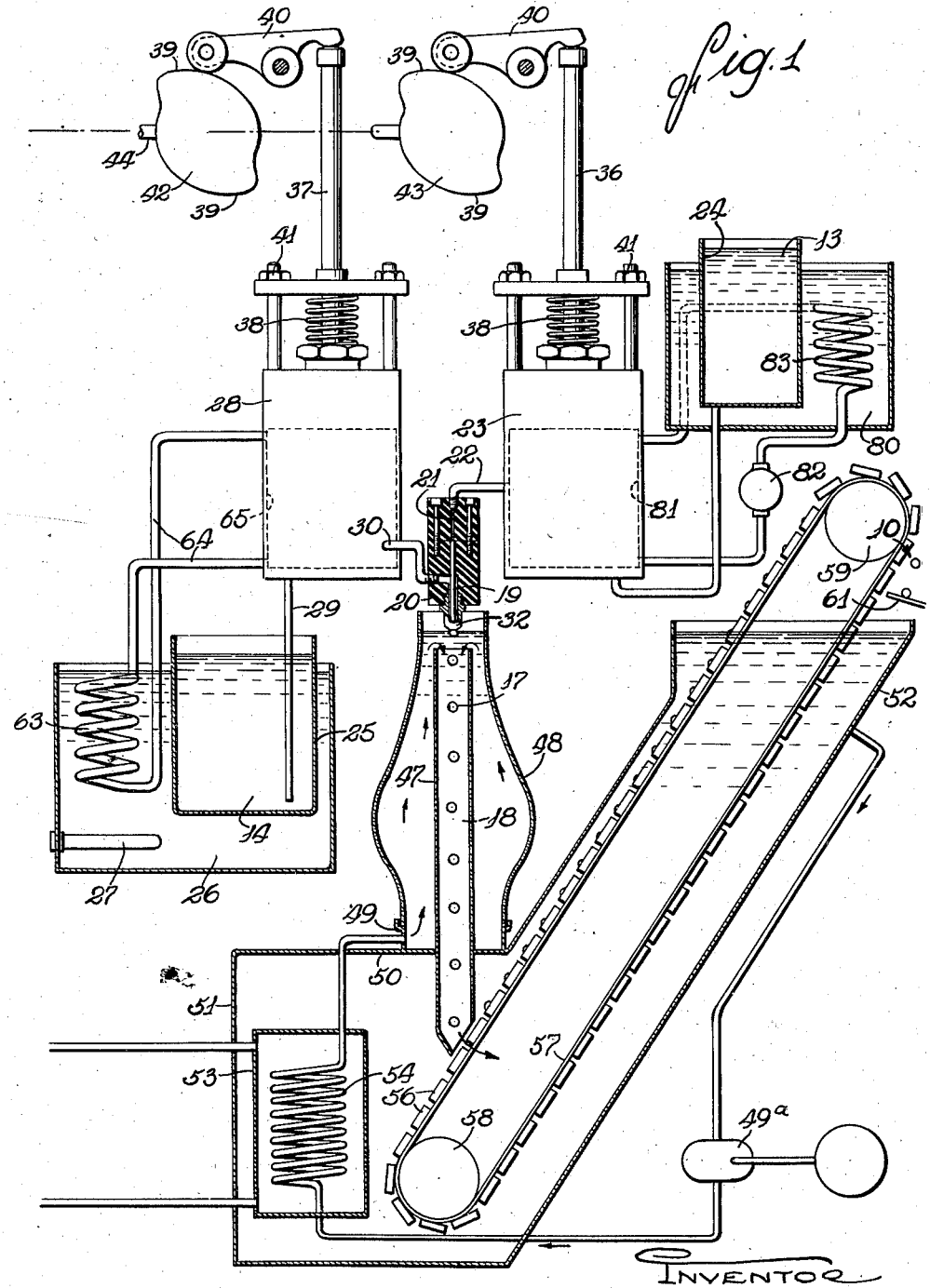

For purposes of illustration, the invention will be described in connection with the formation of capsules 10 of substantially spherical shape, each comprising (see Fig. 7) a core 11 composed of or containing the material to be capsulated and encased in a solidified shell 12 usually composed of gelatin gelled around and completely enclosing the core and having a uniform wall thickness throughout. Ordinarily, the core material comprises an oil or oil vehicle having the active ingredient dispersed therein or an oil solvent.

The invention is based on my discovery that certain natural forces including gravity and capillarity or surface tension which act on suspended liquid columns may be utilized to unite measured quantities of non-miscible liquids into a compound drop in which a globule of one liquid is encased completely by the other liquid. Accordingly, the invention contemplates discharging measured quantities of liquids from orifices in proper time and positional relation to permit free functioning of said natural forces not only to form a compound drop but also to maintain the form of the drop during the interval required for solidification of the shell material. Formation of the capsule and solidification of its shell is therefore accomplished without the use of molding devices and the application of artificial forces as has been the practice heretofore.

More particularly, the method involves maintaining the bodies 13 and 14 of core and shell materials in a liquid state, intermittently discharging measured amounts of these materials from vertically facing orifices 15 and 16 to form a compound drop 17 which is received in a column of liquid 18 through which vertical movement of the compound drop induced by gravitation is prolonged sufficiently to permit of proper cooling by the liquid to accomplish solidification of the capsule shell. Preferably, the receiving liquid is a transparent liquid in which the shell material 12 is immiscible. Where, as in the present instance, the drop is discharged downwardly, the receiving liquid has a density somewhat less than the compound drop and is maintained at a temperature well below that at which the shell material gels. Herein, its level is spaced below the orifice 16 a distance such that the drop will contact the liquid and be partially supported thereby before it becomes completely formed and falls off from the nozzle tip.

In the present instance, the inner orifice 15 is defined by the lower end of a cylindrical tube 19 preferably composed of an insulating material so as to prevent any substantial transfer of heat between the cold core material and the surrounding warmer gelatin solution 14 present in annular passage 31. The tube 19 is supported in a nozzle body 20 and supplied with the cooled core material 13 through a passage 21 connected by a tube 22 with the discharge outlet of a plunger type metering pump 23 capable of close volumetric displacement adjustment and receiving the core material 13 from a supply tank 24.

The gelatin solution 14 of the proper concentration is contained in a tank 25 which is preferably immersed in a water bath 26 maintained at the desired temperature, as by a thermostatically controlled immersion heater 27. A metering plunger pump 28 operates to draw the solution through tube 29 and discharge through a conduit 30 into the annular passage 31 around the tube 19 defined as a bore in the body 20 and a nozzle stem 32ᵃ and terminating at the orifice 16 in a cap 32. The body 20 is composed of an insulating material whereas the nozzle, consisting of the steam 32ᵃ and the cap 32 is composed of heat-conducting material such as metal. The stem 32ᵃ is threaded into the body 20 and has a shoulder 32ᵇ located to space the lower end 32ᶜ of the stem a short distance below the end of tube 19 which terminates as orifice 15. The difference in positions of orifice 15 and the end 32ᶜ will vary with the size of capsule being produced. The stem 32ᵃ is threaded externally adjacent the shoulder 32ᵇ and the lower end portion is of reduced diameter.

The cap 32 is cup-shaped and apertured at its bottom to form the orifice 16 which is of substantially the same diameter as the bore defining the gelatin passage 31. Its upper end is threaded onto the stem 32ᵃ. The length and internal diameter of the cap are such as to define an annular chamber 33 around the stem 32ᵃ communicating with the bore 31 through an annular gap 34 between the end of the stem and the orifice 16. Holes 35 in the cap near its upper end open outwardly so as to constitute the chamber 33 a capillary ring the purpose of which will be explained later.

The pumps 23 and 28 may be of any well known type adapted to eject an accurately metered quantity of fluid during each down stroke of their piston rods 36 and 37. The latter are raised by springs 38 and are projected downwardly with an accelerated motion by cam surfaces 39 acting on followers 40 that bear against the upper ends of the piston rods. By adjusting nuts 41, the pump strokes may be varied in length and the amount of core and shell materials discharged intermittently through the orifices 15 and 16 may be adjusted as desired. Proper timing of the discharges is effected as by driving the cams 42 and 43 from a common shaft 44.

Drop formation in the manner contemplated may best be effected by shaping of the cams to provide for gradual acceleration of the pump plungers to a high rate near the end of the discharge stroke and for a rapid return stroke. Thus, the rate of flow of the ejected materials 11 and 12 increases as the volume of the drop increases, and preferably the rate of this increase is such as to maintain a constant rate of increase in the drop diameter and to time the completion of the drop with its separation from the nozzle. The spring return of the plungers functions to give a sharper pump valve action and assists thereby in preventing dribble at the nozzle. Together, these features contribute to the high output of the apparatus.

To assist in eliminating objectionable dribble at the nozzle orifices and the attending difficulties, the discharge valves of the pumps should be located as close as possible to the orifices, and the bores of the lines connecting the pumps and orifices should be sufficiently small to exert capillary action on the liquids but large enough to permit the free flow of the required amounts of the liquids without any appreciable line resistance.

Provision is made for maintaining the column of receiving liquid at a substantially uniform temperature throughout its entire mass with the coolest point at or near the top of the column where the compound drops first contact the liquid. This may be accomplished by providing two columns of the liquid, one within the other, and circulating the liquid through the two columns by admitting the cooled liquid at the bottom of the outer column. In the present instance, the inner column is defined by a vertical glass tube 47 placed within a larger glass tube 48 with its upper end disposed somewhat below the maintained level in the outer tube. The latter preferably is bulged outwardly and is enlarged below the inner tube in order to prevent turbulence of the receiving liquid at the point of entry of the capsule drop which can also be accomplished by increasing the total volume of liquid between the tubes 47 and 48. The lower end of the tube 48 is fitted in a tubular projection 49 on the closed top 50 of a tank 51 having an upwardly opening extension 52 which rises above the liquid level to be maintained. The tank 50 and tube 48 are filled with the receiving liquid which is cooled by circulation of refrigerant or a chilled liquid through an exchanger 53 within the tank. Circulation of the cooled receiving liquid upwardly through the tube 48 and downwardly through the tube 47 is effected by a motor driven gear pump 49ᵃ arranged to withdraw liquid from the uppermost part of the tank and deliver such liquid through a cooling coil 54 within the exchanger to the lower end of the tube 48. The cooled fluid thus circulates as indicated by the arrows in Fig. 1. Since the upper end of the tube 47 is disposed somewhat below the liquid level, turbulence at the liquid surface is avoided and yet the liquid in which the drops are first received is maintained at the desired low temperature.

The nozzle is positioned in alinement with the tube 47 so that the falling drops 17 descend therethrough, the rate of descent being determined by the relative densities of the compound drop and receiving liquid. This is prolonged sufficiently to enable the shell material to cool below the gel point and thereby congeal to a rubbery consistency. The capsules thus formed descend through the open lower end of the tube 47 onto an elevator by which they are raised out of the receiving liquid. Herein, the elevator comprises a series of buckets 56 on an endless conveyor belt 57 which is supported in inclined position by rollers 58 and 59 with the lower portion submerged in the liquid in the tank. The buckets are generally U-shaped with their open ends secured as by rivets 60 (Fig. 8) to the belt. Thus, in traveling around the roller 59, the closed end of each bucket will be lifted clear of the belt as shown, thus breaking any capillary action between the bucket and the capsule caused by the adhering liquid so that the latter will fall clear of the belt into a collecting trough 61. Any excess of receiving liquid still retained on the capsule surfaces will be removed by treatment with the necessary solvent. The capsules are then case hardened by some dehydrating agent.

The relationship of the physical characteristics of the core and shell materials themselves and of their combination to that of the receiving liquid is important when these materials are conditioned to permit the free functioning of the natural forces in creating a compound drop of core and shell materials which eventuate in a capsule by congealing the shell material into a commercially permanent coating enclosing and seamlessly sealing the core material therein. The shell and core materials now commonly used are not naturally miscible. Gelatin serves the commercial demands admirably and lends itself readily to capsule manufacture. The core vehicle is selected to meet the physical characteristics of gelatin and the process of making capsules. The production of capsules as herein described needs to take but little consideration of the core material characteristics as the natural forces are brought to bear chiefly on the shell material. The shell material is brought into contact with the receiving liquid which permits the natural forces of capillarity to pull the composite drop to a substantially spherical shape which force also spreads the liquid shell material to an even thickness over the entire exterior of the core, thereby forming a uniform shell thickness which cannot be attained by the die processes commonly used. The design above described of the nozzle assembly provides for action of the shell material 14 within the nozzle as a receiving liquid for the core material 13 while it is being incorporated within the shell material to form a compound drop. Capillarity pulls the core material 13 into a substantially spherical form in the same manner as the compound drop is formed in the receiving liquid 18.

Since the shell 12, here supposed to be composed of gelatin, must be dehydrated after the capsule is completed, it is desirable that a minimum amount of water be used in putting the solid gelatin into solution. To this solution, enough hygroscopic material, such as glycerin, is added to insure a continued rubbery consistency to the capsule shell during storage.

It will be necessary to determine the critical temperatures of the gelatin solution being used in order to know what temperatures are to be maintained in the process of producing capsules. In general, it will be found that most gelatin solutions are free flowing at or near 100 degrees Fahrenheit and gel readily at temperatures below 40 degrees.

Since the wall sections of the capsule forming drops are relatively thin, it will be found that little difficulty will be encountered in maintaining the gelatin solution 14 in the tank 25 at a temperature where it is free flowing to eliminate difficulties in pumping and congestion at the nozzle tip and yet be able to accomplish quick gelling once the compound drop is deposited in the receiving liquid. Quick gelling is accomplished by rapid dissipation of a minimum amount of heat.

To maintain the correct shell solution temperature while it is being moved from supply tank 13 through the pump 28 to the nozzle assembly, a heat exchanger 63 is immersed in water bath 26 and connected by pipes 64 with the inlet and outlet of a jacket 65 surrounding the cylinder of the pump 28. A thermo-siphonic system is thus formed which draws its heat from water bath 26 and provides for gradually lowering of the temperature of the shell material solution 14 between the reservoir 25 and the nozzle tip which is maintained at a temperature above the gel point of the shell material. The maintenance of such nozzle temperature is made possible and possible congestion in the orifice 16 is avoided in the present instance by virtue of the fact that the nozzle is spaced above the receiving liquid and therefore is not cooled appreciably.

To assist in congealing of the capsule shell 12 after the drop is formed, and while forming, the core material 11 in the tank 24 and in the pump 23 is preferably cooled to a temperature well below the gel point of the shell material solution. To this end, a tank 24 is immersed in a brine bath 80 and cooling medium is circulated through a jacket 81 around the pump 23 by a pump 82, the medium being cooled by passage through a coil 83 immersed in the brine 80.

Preferably, the nozzle is located close to the pumps so as to avoid any substantial temperature change in the solutions during transfer thereof to the nozzle.

When the drop is discharged downwardly from the nozzle as in the present instance, the receiving liquid should have a specific gravity slightly less than that of the compound drop so that it will permit each drop to fall from the nozzle and descend slowly and yet not interfere with the sequence of continuous drop formation. It must be capable of being cooled substantially below the gel point of the gelatin and still remain free flowing. It should have dehydrating properties and preferably be transparent. As a prime requisite, its interfacial surface energy relation to that of the gelatin solution must be such that it acts to accelerate the action of capillarity in the gelatin solution which causes the drop to take on a spherical shape once it is free from the nozzle tip. Numerous liquids will function as a receiving medium but commercial vegetable oils have been found to serve best.

The progressive formation of the capsule will now be traced. As a preliminary, it will be observed that the nozzle orifices, arranged as above described, provide for the discharge of globules of core and shell materials in the relation which they occupy in the finished capsules, which general relation is maintained during the action of the natural forces on the globules from the time they emerge from the orifices until final congealing of the shell material to form a completed capsule.

After the falling of one drop and during the return strokes of the pump plungers, the materials will be positioned in the nozzle as shown in Fig. 2. Through the action of the capillary arrangement comprising the annular passage 34 and the chamber 33 incorporated in the nozzle, the surplus materials which are necessarily present for drop formation are retracted into these chambers by natural capillary forces. This action takes place on the gelatin solution only and serves to prevent contact between the static gelatin solution on the nozzle tip and the surface of the receiving liquid 18, but its chief function is to serve as an automatic intermittently functioning reservoir for the surplus material between drops and prevent the formation of secondary drops which otherwise would represent commercial waste. As the pump plungers descend simultaneously, a globule 66 of the core material forms on the tube 19 within the orifice 16, and a similarly shaped globule 67 hangs from the nozzle tip with its lower portion projecting into the receiving liquid (Fig. 3) by which it is partially supported. The globules increase in size progressively during the active pump stroke. Finally, at the end of the stroke, the weight of the liquids ejected less the buoyant force exerted on the drop by the receiving liquid will exceed the forces of capillarity which tend to hold the drop on the nozzle. The commercial size of the capsule to be made determines the quantity of core material to be ejected by each stroke of pump 23 and this in turn determines the amount of shell material 12 required to be supplied by the pump 28. The composite weight of the core and shell materials which form the drop determines the size of the orifice 16 under the established drop weight and liquid column stability laws.

As the size of the drop increases, the action of capillarity or surface tension reacts in accordance with the liquid column stability law and the liquid column of the composite shell and core materials is progressively reduced in size between the nozzle tip and the body of the drop as indicated at 69 and 70 until it is finally pinched off when the drop weight exceeds the natural forces tending to hold the entire suspended drop mass as a unit. The surplus 70 left attached to the nozzle tip is withdrawn into capillary ring 33 in which the level lowers progressively as shown through the successive stages of formation of the drop. The separated drop 17, fully submerged in receiving liquid 18, is pulled to a substantially spherical shape practically instantaneously by the action of the surface energy of the gelatin solution shell, thereby completing the formation of the drop that forms the capsule upon congealing of the shell.

During the descent of the compound drop 17 through the receiving liquid, heat from the gelatin is absorbed by the core and by the receiving liquid until, before the drop reaches the lower end of the column, the shell will be congealed sufficiently to become a permanent substantially true sphere ready for retrieving by the elevator.

Should an incorrect amount of shell material be ejected by pump 28 in proportion to a given quantity of core material ejected by pump 23, either of two situations will arise. If the amount of shell material 12 be too small, a capsule of too thin a wall section will result. If the amount of shell material 12 be too great, the weight as represented by the force of gravity will pull the excess shell material to the lower side of the drop as it descends through the receiving liquid 18 to the lower side of the drop and eccentricity between the core and shell will result. In the latter case, the force of gravity, acting on the excess shell material, exceeds the force of capillarity tending to hold the drop to spherical form. Such detrimental effects may readily be overcome by accurate control of the ejected materials and operating conditions.

It will be apparent from the foregoing that one capsule will be formed during each stroke of the pumps 23 and 28. By duplicating the nozzles and pumps, any desired number of tandem units may be added and the capacity of the apparatus accordingly multiplied. To change the size of the capsules produced, it is merely necessary to replace the nozzle assembly including the stem 32 and the parts attached thereto and to adjust the pumps. Once the apparatus is adjusted, capsules may be formed at a rapid rate without loss of material and spoilage which is inherent in the die processes of capsulation now in common use.

I claim as my invention:

1. Capsulating apparatus comprising, in combination, a downwardly facing orifice, means for discharging a measured quantity of liquid core material from the orifice to form a drop, an annular orifice enclosing and projecting below said first orifice, mechanism for discharging liquid solidifiable shell material from said annular orifice to form a shell around said drop and cause the compound drop to fall, and a column of liquid so spaced below said orifices as to receive and support the composite drop during formation upon the orifice, and having a density less than the drop, said liquid being maintained at a temperature substantially below that at which said shell material will congeal.

2. Capsulating apparatus comprising, in combination, a downwardly facing orifice, means for discharging a measured quantity of core material from the orifice to form a drop, a second orifice spaced below said first orifice, mechanism for discharging liquid solidifiable shell material from said second orifice to support and form a shell around said drop, and a column of liquid maintained at a temperature substantially below that at which said shell material will congeal, said column being disposed so spaced below said lower orifice as to receive the compound drop while the latter is still attached thereto.

3. Capsulating apparatus comprising, in combination, a downwardly facing orifice, means for discharging a measured quantity of liquid core material from the orifice, a larger orifice enclosing said first orifice and axially spaced therebelow, mechanism for intermittently discharging liquid solidifiable shell material from said second orifice to form a shell around said discharged core material to form a compound drop and cause the compound drop to fall, said second orifice being shaped to retain a quantity of said shell material in advance of said core material and constituting a receiving liquid for the core material as the latter is being discharged from said first orifice, and a column of liquid below said orifices positioned to receive said drop during formation thereof on the orifices.

4. Capsulating apparatus having, in combination, two orifices arranged one within the other, means for discharging liquid core and shell materials from said orifices intermittently to form a succession of separated compound drops, and a capillary column communicating with the outer orifice and opening above the latter.

5. Capsulating apparatus having, in combination, two orifices one surrounding the other, means for discharging liquid core and shell materials from said orifices intermittently to form a succession of separated compound drops, and means for causing a capillary force to be exerted on the shell liquid suspended from said outer orifice after formation of each drop.

6. In a capsulating apparatus, a nozzle comprising an orifice adapted for the discharge of one liquid therefrom, an annular orifice surrounding said first orifice and axially spaced therefrom, said second orifice being adapted for the discharge of a second liquid therefrom, and an annular capillary space surrounding said second orifice and communicating with the space between said two orifices.

7. The process of capsulation which comprises intermittently discharging core material and molten gelatin from a nozzle to form compound drops, and immersing each drop, before it falls from the nozzle and while the gelatin is in a liquid state, in a column of liquid having a temperature below the gel point of the gelatin and a density less than the drops.

8. The process of capsulation which includes the steps of discharging quantities of core and shell materials from downwardly facing orifices positioned one within and above the other for the natural formation of a compound drop with the shell material surrounding the core material, supporting each drop during its formation freely pendant below the lower orifice in a liquid having a density less than the compound drop and discharging the compound drop from the orifice and passing the drop through said liquid.

9. The method of forming compound drops of two non-miscible liquids which includes the steps of intermittently discharging a globule of one liquid from an orifice, simultaneously discharging a quantity of the other liquid from a surrounding orifice to form a shell around each globule forming a compound drop freely suspended from the latter orifice and adapted to fall therefrom, and applying capillary forces to the portion of said last mentioned liquid which is retained on said outer orifice after each drop falls.

10. The method of forming gelatin capsules which comprises downwardly extruding said gelatin in liquid form through an orifice, introducing into such extruded gelatin through a pipe located in the center of said orifice a medicinal component, said extrusion being carried out sufficiently slowly so that the gelatin-surrounded medicinal separates into drops by the forces of gravity and surface tension.

11. The method of forming capsules which comprises downwardly extruding in liquid form through an orifice the material which forms the outer layer of the capsule, introducing into such extruded capsule forming material through a pipe located in the center of said orifice a medicinal component, said extrusion being carried out sufficiently slowly so that the medicinal surrounded by the outer layer separates into drops.

12. The method of forming gelatine capsules which comprises downwardly extruding said gelatin in liquid form through an orifice, introducing into such extruded gelatin through a pipe located in the center of said orifice a medicinal component in liquid form, said extrusion being carried out sufficiently slowly so that the gelatin-surrounded medicinal separates into drops by the force of gravity.

13. In the method of forming gelatin capsules containing a medicinal center, the steps which comprises extruding the gelatin component of said capsules in liquid form downwardly through an annular orifice, introducing the desired medicinal components into said gelatin component while the latter is in the orifice, said extrusion being carried out sufficiently slowly so that the combined components separate into drops by the force of gravity.

14. In the method of forming gelatin capsules containing a medicinal center, the step which comprises extruding the gelatin component of said capsules in liquid form downwardly through an annular orifice, introducing the desired medicinal components into said gelatin component while the latter is in the orifice, said extrusion being carried out sufficiently slowly so that the combined components separate into drops.

15. The method of forming capsules which comprises heating liquefiable but normally solid capsule material to liquefy the same, forcing said material in liquid form out of an orifice to form as a liquid droplet the outer layer of the desired capsule, introducing through means located within the orifice an inner component to be contained in the droplet, carrying out said operations, including application of heat to the capsule material, at a rate such that the combination of inner component surrounded by the outer layer separates into an individual falling drop which solidifies after separation.

16. The method of forming capsules which comprises downwardly extruding in liquid form through an orifice the material which forms the outer layer of the capsule, introducing into such extruded capsule forming material through a pipe located in the center of said orifice a medicinal component, said extrusion being carried out at such a rate that the medicinal surrounded by the outer layer separates into drops, and causing the drops to fall through a cooling medium.

17. The method of forming capsules which comprises downwardly extruding in liquid form through an orifice the material which forms the outer layer of the capsule, introducing into such extruded capsule forming material through a pipe located in the center of said orifice a medicinal component, said extrusion being carried out at such a rate that the medicinal surrounded by the outer layer separates into drops, and causing the drops to fall through a cooling medium, the specific gravity of which is less than that of the drops.

18. The method of forming capsules which comprises downwardly extruding in liquid form through an orifice the material which forms the outer layer of the capsule, introducing into such extruded capsule forming material through a pipe located in the center of said orifice a medicinal component, said extrusion being carried out at such a rate that the medicinal surrounded by the outer layer separates into drops, and causing the drops to pass through a cooling medium.

19. That method of forming capsules which comprises downwardly extruding in liquid form through an orifice material which forms the outer layer of the capsule, extruding into such extruded outer layer forming material through a pipe located in the center of the orifice capsule content material, said extrusion being carried out sufficiently slowly so that the content material surrounded by the outer layer material separates from the orifice by the forces of gravity and surface tension and forms a compound drop, and passing said compound drop through a cooling fluid medium.

20. That method of forming capsules which comprises downwardly extruding in liquid form through an orifice the material which forms the capsule shell, extruding capsule content material into such extruded shell forming material to be partially surrounded by the shell forming material, carrying out such extrusion sufficiently slowly so that the content material partially surrounded by the shell material hangs pendent from the orifice as a compound drop for a limited time and then under the forces of gravity and surface tension separates therefrom, partially supporting said compound drop while it is hanging pendent from the orifice upon a fluid medium, and causing said compound drop following separation from the orifice to pass through said fluid medium.

21. That method of forming capsules which comprises downwardly extruding in liquid form through an orifice the material which forms the capsule shell, extruding capsule content material into such extruded shell forming material to be supported and partially surrounded by the shell forming material, carrying out such extrusion sufficiently slowly so that the content material supported and partially surrounded by the shell material hangs pendent for a limited time from the orifice as a compound drop and then separates therefrom under the forces of gravity and surface tension, partially supporting said compound drop while hanging pendent from the orifice upon a cooling liquid medium, causing said compound drop following its separation from the orifice to pass through said cooling liquid medium.

22. That process of capsulation which comprises extruding capsule shell forming material in liquid form through an orifice, extruding capsule content material into such extruded shell material, carrying out such extrusion sufficiently slowly so that the shell material and content material partially surrounded by the shell material hangs pendent from the orifice for a limited time as a compound drop and with the shell material sufficiently liquid to respond to surface tension activity and discharging said compound drop from the orifice and causing it to pass through a fluid cooling medium to solidify the shell material.

23. That process of capsulation which comprises extruding capsule shell forming material in liquid form through an orifice, extruding capsule content material into such extruded shell material causing the extruded shell forming material to partially surround the content material, carrying out such extrusion sufficiently slowly so that the shell forming material and content material partially surrounded thereby hangs pendent from the orifice for a limited time and with the shell material sufficiently liquid to respond to surface tension activity, discharging said extruded content material and shell material as a compound drop from the orifice with the shell material surrounding the content material, and passing said compound drop through a liquid cooling medium.

24. That process of capsulation which comprises extruding capsule shell forming material in liquid form through an orifice, extruding capsule content material into such extruded shell material causing the extruded shell material to partially surround the content material forming a compound drop, separating the compound drop from the orifice and passing the drop while the shell is responsive to surface tension activity in suspension through a liquid medium for a sufficient time to cause the shell to assume a surface tension induced shape about the content material.

25. That process of shaping a capsule shell while surrounding capsule content material comprising passing the complete capsule in suspension and while the capsule shell is sufficiently liquid to respond to surface tension rearrangement of it molecules through a liquid medium for a sufficient period of time to permit the shell to assume a surface tension induced shape about the content material.

26. That process of capsulation which comprises extruding capsule shell material in liquid form through an orifice, extruding capsule content material through an orifice into such extruded shell material causing the shell material to partially surround the content material forming a compound drop supported from the shell material discharge orifice, separating the extruded content material and the shell material constituting the drop from the orifices through which said materials are discharged causing the shell material to completely surround the content material forming an independent compound drop and passing said compound drop while the shell material is sufficiently liquid to respond to surface tension activity in suspension through a liquid medium for a time sufficient to permit the shell to assume a surface tension induced form about the content material.

27. That process of shaping a capsule shell while surrounding capsule content material comprising passing the complete capsule in suspension and while the capsule shell is sufficiently liquid to respond to surface tension rearrangement of its molecules through a liquid medium for a sufficient period of time to permit the shell to assume a surface tension induced shape about the content material, said liquid medium characterized as having a density different from that of the complete capsule to facilitate movement of the capsule through the liquid medium.

28. That process of shaping a capsule shell while surrounding capsule content material comprising passing the complete capsule in suspension and while the capsule shell is sufficiently liquid to respond to surface tension rearrangement of its molecules through a liquid medium having a relatively high interfacial surface tension relationship with respect to the capsule shell and continuing said passing for a sufficient period of time to permit the shell to assume a surface tension induced shape about the content material.

CARL E. MABBS.